(12) United States Patent
Hosokawa et al.

(10) Patent No.: US 7,973,509 B2
(45) Date of Patent: Jul. 5, 2011

(54) NUMERICAL CONTROLLER HAVING CONTROL MODE SWITCHING FUNCTION

(75) Inventors: Masahiko Hosokawa, Minamitsuru-gun (JP); Shuji Ogawa, Minamitsuru-gun (JP); Kazuhiko Sonobe, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 311 days.

(21) Appl. No.: 12/269,068

(22) Filed: Nov. 12, 2008

(65) Prior Publication Data
US 2009/0153092 A1 Jun. 18, 2009

(30) Foreign Application Priority Data
Dec. 13, 2007 (JP) ................................. 2007-322633

(51) Int. Cl.
*G05B 19/18* (2006.01)
(52) U.S. Cl. ........................................ 318/569; 318/560
(58) Field of Classification Search .................. 318/560, 318/567, 569, 590, 591, 609, 610, 649
See application file for complete search history.

(56) References Cited

U.S. PATENT DOCUMENTS

| 4,553,078 | A | * | 11/1985 | Wise ............................ 318/592 |
| 4,888,536 | A | | 12/1989 | Sakai et al. |
| 4,902,950 | A | * | 2/1990 | Kawamura et al. ............ 318/627 |
| 5,079,490 | A | * | 1/1992 | Kita et al. ...................... 318/569 |
| 5,519,297 | A | | 5/1996 | Kono et al. |
| 2003/0187542 | A1 | * | 10/2003 | Endo et al. .................... 700/186 |
| 2006/0173573 | A1 | * | 8/2006 | Hosokawa et al. ............ 700/193 |
| 2007/0100493 | A1 | * | 5/2007 | Fujibayashi et al. .......... 700/169 |
| 2007/0145931 | A1 | * | 6/2007 | Onishi et al. .................. 318/569 |
| 2007/0198125 | A1 | * | 8/2007 | Hosokawa et al. ............ 700/181 |

FOREIGN PATENT DOCUMENTS

| JP | 62-154109 | 7/1987 |
| JP | 7-164282 | 6/1995 |
| JP | 8-39392 | 2/1996 |
| JP | 11-338547 | 12/1999 |
| JP | 2001-134321 | 5/2001 |

OTHER PUBLICATIONS

Machine translation of JP07164282A.*
Japanese Notice of Reasons for Rejection mailed Mar. 17, 2009 issued in JP Application No. 2007-322633 (including a partial translation thereof).
European Search Report dated Dec. 10, 2010 that issued in European Application No. EP 08 16 6674.

* cited by examiner

*Primary Examiner* — Bentsu Ro
*Assistant Examiner* — Kawing Chan
(74) *Attorney, Agent, or Firm* — Drinker Biddle & Reath LLP (57) ABSTRACT

A pulse distribution unit notifies a mode control/instruction unit of an output start signal. The mode control/instruction unit outputs a mode setting signal, a speed command signal, and a compensation pulse to an axis control unit. In a position control mode, the mode control/instruction unit continues outputting the speed command signal to the axis control unit until the mode control/instruction unit receives the output start signal from the pulse distribution unit, and stops, up receiving the output start signal, outputting the speed command signal. The compensation pulse is output to the axis control unit to cancel the difference between a spindle position and the position control start reference position of the spindle. The axis control unit adds the compensation pulse to the position command signal of the spindle output from the pulse distribution unit and outputs the result to a servo control unit.

3 Claims, 9 Drawing Sheets

(TURNING)

~

MxxC??;

G05P10***;

M3S1000;

~

(TURNING)

~

M30

%

NUMERICAL CONTROLLER HAVING CONTROL MODE SWITCHING FUNCTION

RELATED APPLICATIONS DATA

This application claims priority under 35 U.S.C. §119 and/or §365 to Japanese Application No. 2007-322633 filed Dec. 13, 2007, the entire contents of which are incorporated herein by reference.

BACKGROUND OF THE INVENTION

1. Field of the Invention

The present invention relates to a numerical controller having a function of switching the control mode of a spindle motor between a speed control mode and a position control mode.

2. Description of the Related Art

A piston lathe machine for out-of-round (elliptical) workpiece machining repeats a lot of piston-shaped workpiece machining by performing the following two types of machining in sequence.

(1) Performing round turning for an outside shape of a piston or a groove for a piston ring by rotating a workpiece spindle driven by a spindle motor with an S command (hereinafter referred to as speed control)

(2) Executing a movement command for a workpiece spindle and an axis that performs cut-in operation with a machining program by switching the control mode of the workpiece spindle driven by the spindle motor to a position control mode. In this case, out-of-round cutting is performed by synchronizing between the rotation of a rotation axis and the cut-in operation of a cut-in axis using a movement command, which is the function (hereinafter referred to as high-speed cycle machining) of executing a previously prepared command pulse data according to the machining shape.

Elliptical workpiece machining will be described as an example of specific machining procedure. First, a workpiece is machined to a 100-mm radius round shape by the machining in (1) above. Next, the workpiece is machined to an elliptical shape with a major axis of 100 mm and a minor axis 99 mm by the machining in (2) above. In this case, the workpiece machining of an elliptical shape with a minor axis radius of 99 mm is enabled by repeating movement to the 99-mm position, 100-mm position, 99-mm position, and 100-mm position on the basis of an instructed position command pulse with the position of the cut-in axis which moves in synchronization with the rotation axis, in the major axis direction of the rotation axis, assumed to be 100 mm, while executing a position command pulse for the rotation axis for rotational movement of 90 degrees, 180 degrees, 270 degrees, and 360 degrees with the reference position return completion position after switching to position control mode assumed to be oriented in the major direction of the rotation axis (0 degree).

The elliptical shape of an actual piston is a special out-of-round shape with workpiece material and the thermal expansion of each part taken into consideration, so high-speed cycle machining that enables interpolation using arbitrarily specified pulse data for each minute interpolation cycle is performed to improve the machining precision of a required machining shape.

In a numerical controller with a computer, a servo motor can be used for position control or rotational speed control as in a spindle motor. According to the technology disclosed in Japanese Patent Application Laid-Open No. 2001-134321, it is possible to drive an NC axis and a spindle with a servo motor kept in the position control state and it is possible to switch between positioning operation according to a positioning command for the NC axis and rotation operation according to a rotation count command for the spindle, so that it is unnecessary to switch between speed control and position control.

During switching between the machining in (1) and the machining in (2) above, to switch the control mode of the rotating spindle motor from speed control to position control, the spindle motor needs to be decelerated and stopped, and a reference position return command needs to be executed before a position command is executed in position control.

The reference position return command moves the spindle motor to the motor-specific reference position and sets the coordinates of the rotation axis of the numerical controller after the spindle motor stops. Conventionally, for establishing the coordinates of the numerical controller, it is necessary that the movement of the axis concerned be in a stopped state.

The machining in (2) above is performed in position control, but, because the motor performance of an axis that performs cut-in operation and the follow-up performance of the machine have been improved so far to reduce the time for machining an out-of-round workpiece, it is becoming possible to perform machining at a rotational speed close to a speed at which round machining is performed by rotating a spindle in speed control.

In this case, to further reduce the machining cycle time of workpiece machining, it is necessary to reduce the time for deceleration and stop, movement to the reference position, and acceleration during switching from speed control to position control. However, switching from speed control mode to position control mode takes much time, thereby increasing machining cycle time.

In the technology disclosed in Japanese Patent Application Laid-Open No. 2001-134321 above, the NC axis and spindle are driven with the servo motor kept in position control and switching between positioning operation according to the positioning command for the NC axis and rotation operation according to the rotation count command for the spindle is performed, but this patent document does not clearly describes whether or not such switching is possible without stopping the position command and the rotation command, so the problem to be solved is different between the technology disclosed in the above patent document and the numerical controller according to the present invention which has the function of switching the control mode of the spindle motor between speed control mode and position control mode.

SUMMARY OF THE INVENTION

An object of the present invention is to provide a numerical controller that requires less time for workpiece machining by eliminating the need for the deceleration and stop of a spindle during switching of the control of a spindle motor from speed control to position control.

The numerical controller of the present invention has a control mode switching function for controlling a spindle by switching a control mode between a speed control mode for rotating a spindle motor according to a speed command and a position control mode for performing position control of the spindle motor according to a movement command. The numerical controller comprises: means for storing a position control start reference position of the spindle when the control mode is switched from speed control mode to position control mode; means for maintaining a rotational speed of the spindle motor immediately before switching to position control mode during execution of a position control mode switching command for switching the control mode from speed control mode to position control mode; position detection means for detecting a spindle position; differential value storage means for calculating and storing a difference between the spindle position at the start of execution of the position control mode switching command and the position control start reference position; means for calculating a position command pulse of the spindle on the basis of a program command and outputting the calculated position command pulse to a spindle motor driving unit, during the position control mode; compensation pulse calculation means for calculating a compensation pulse from a value stored in the differential value storage means; addition compensation means for adding the calculated compensation pulse to the calculated position command pulse and outputting the addition result; and spindle motor driving means for driving the spindle motor based on the addition result output by the addition compensation means, without stopping the spindle motor by using the means for maintaining the rotational speed of the spindle motor.

The compensation pulse calculation means may calculate a compensation pulse for each computation cycle of the numerical controller and limits the magnitude of the compensation pulse for each computation cycle to less than a predetermined value.

The numerical controller may further comprise a switching completion signal output means for outputting a position control mode switching completion signal when all of the values stored in the differential value storage means are output as compensation pulses to allow machining in position control mode to be started after the position control mode switching completion signal is output.

As the numerical controller of the present invention has the structure described above, the spindle does not have to be decelerated or stopped during switching of the control of the spindle motor from speed control to position control, thereby achieving reduction in workpiece machining time and improvement of productivity.

The numerical controller of the present invention can achieve the similar machining cycle time as in the prior art by using a low-cost spindle motor with low acceleration/deceleration capability, not using a high-cost spindle motor with high acceleration/deceleration capability. In addition, the number of times the spindle motor is accelerated or decelerated can be reduced, thereby saving the power consumption during a workpiece machining process.

According to the present invention, an interpolation between an axis switched to the position control and the other axes will produce a non-cutting command portion until movement to the position control start reference position is completed, since the synchronization among these axes is not guaranteed, but the cycle time can be reduced in the entire machining program.

BRIEF DESCRIPTION OF THE DRAWINGS

The purposes and advantages of the present invention, including those described above, will be clarified by reference to the attached drawings in combination with the description of the embodiment presented below. Of these drawings.

DETAILED DESCRIPTION OF THE PREFERRED EMBODIMENTS

Figure 1:
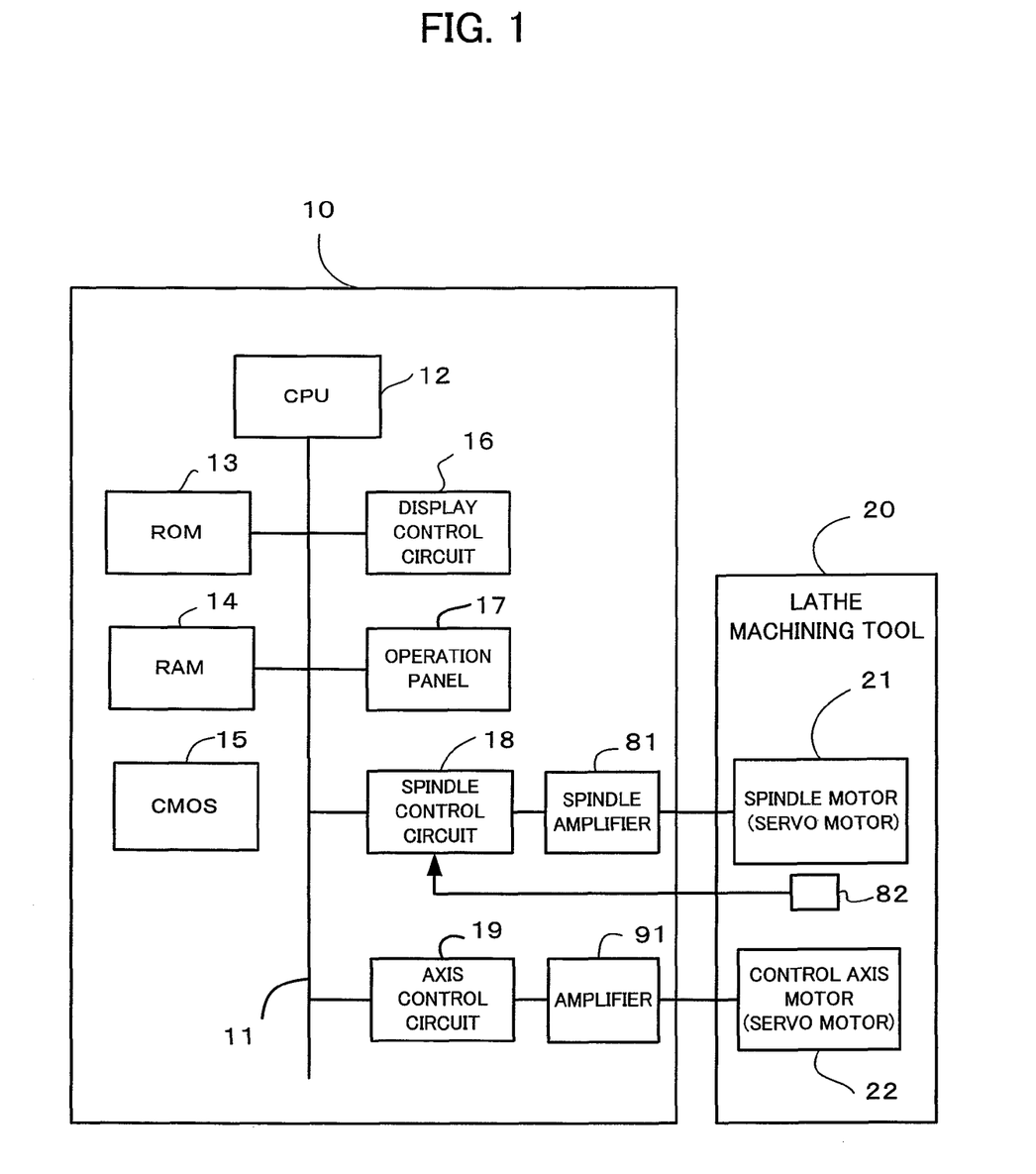
FIG. 1 is a schematic block diagram showing an embodiment of the numerical controller of the present invention which has a control mode switching function.

FIG. 1 is a schematic diagram of a numerical controller 10. The numerical controller 10 comprises a processor (CPU) 12, a ROM 13, a RAM 14, a CMOS memory 15, a display control circuit 16, an operation panel 17, a spindle control circuit 18, an axis control circuit 19, and a bus 11. The CPU 12 reads out a system program stored in the ROM 13 via the bus 11 and controls the entire numerical controller 10 according to the system program. The RAM 14 temporarily stores computation data and display data, and also stores various types of data input by an input means (not shown). The ROM 13 stores various system programs and editing functions required to create and edit machining programs, in advance. The CMOS memory 15 is backed up by a battery (not shown) and configured as a non-volatile memory that retains stored data even when the numerical controller 10 is powered off. The CMOS memory 15 stores machining programs etc.

The spindle control circuit 18 receives a spindle rotation command and outputs a spindle speed signal to a spindle amplifier 81. The spindle amplifier 81 receives the spindle speed signal and rotates a spindle motor 21 at an instructed rotational speed. A position detector 82 feeds back a feedback pulse to the spindle control circuit 18 in synchronization with the rotation of the spindle motor 21 to perform speed control. Upon switching to a spindle position (C-axis) mode, the spindle control circuit 18 controls the spindle position based on an instructed rotation position and a one-turn signal and a feedback pulse which are fed back from the position detector 82.

The axis control circuit 19 receives a movement command for an axis that performs cut-in operation (hereinafter referred to as cut-in axis) and outputs the movement command to a servo amplifier 91. The servo amplifier 91 receives this command and drives a control axis motor 22 of a lathe machining tool 20. The control axis motor 22 feeds back position and speed feedback signals, which are received from a built-in position/speed detector (not shown), to the axis control circuit 19 to performs position and speed feedback control. The position and speed feedback control is not described here.

Figure 2:
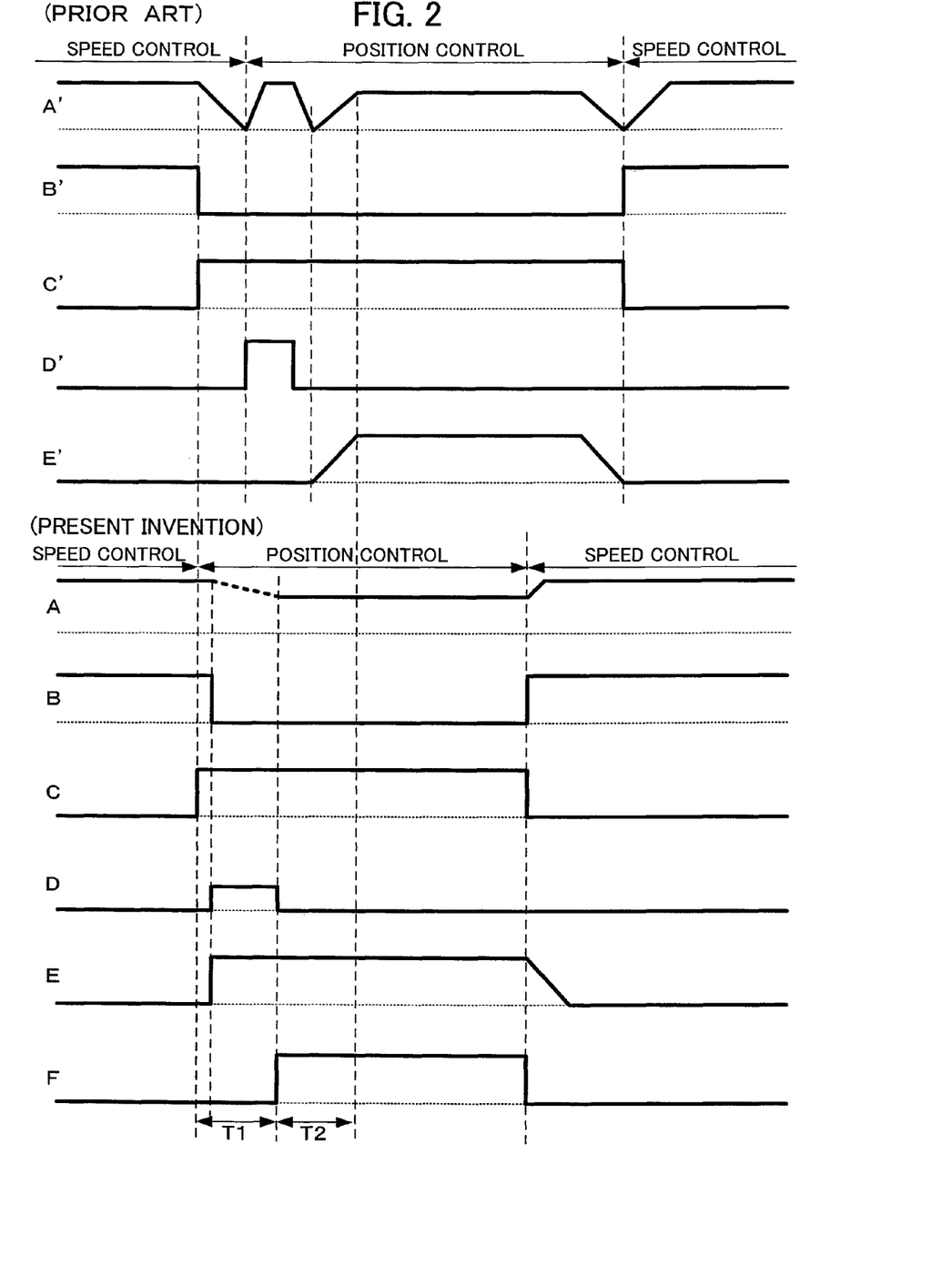
FIG. 2 compares spindle control between the numerical controller of the present invention and a prior-art numerical controller.

FIG. 2 compares spindle control between the numerical controller of the present invention and a prior-art numerical controller.

Lines A' to E' show how the switching between speed control mode and position control mode is performed in the prior art.

Item A' represents the spindle speed. Line A' indicates that a workpiece spindle is controlled by switching between a period in which speed control is performed by an S command and a period in which position control is performed by a G command. In the prior art, when switching of the control of a spindle motor from speed control to position control, acceleration/deceleration control is performed so that the spindle motor is decelerated and stopped and then moved to the reference position specific to the spindle motor.

Item B' represents a speed command. Line B' indicates the speed command that controls the workpiece spindle. The speed command is immediately stopped upon switching from speed control to position control, as shown line B'.

Item C' represents position control mode. Line C' indicates that switching from speed control to position control is performed when the spindle motor of the workpiece spindle stops. When the speed command stops, the spindle speed is decelerated at acceleration specific to the motor and, when the spindle motor stops, position control mode starts. Therefore, a time lag occurs from when the speed command stops to when switching to position control mode is performed.

Item D' represents movement to the start reference position. Line D' indicates that movement operation for moving the spindle motor to the position control start reference position is performed when control of the spindle motor is switched from speed control to position control.

Item E' represents a movement command for high-speed cycle machining. Line E' indicates that the spindle motor moves to the position control start reference position and then the movement command for high-speed cycle machining is started at the time when the spindle motor moves to the position control start reference position. Since the workpiece spindle is in stop state when the movement command for high-speed cycle machining is started as shown by line A', the movement command for high-speed cycle machining is subjected to acceleration control. The switching from position control to speed control is subjected to deceleration control.

Lines A to F show how the switching between speed control mode and position control mode is performed in the present invention.

Item A represents the spindle speed. Line A indicates that a workpiece spindle is controlled by switching between a period in which speed control is performed by an S command and a period in which position control is performed by a G command. Line A indicates that the spindle motor is kept rotating, without being decelerated or stopped, when switched from speed control to position control, in the case of the present invention. The spindle motor is also kept rotating, without being decelerated or stopped, when switched from position control to speed control.

Item B represents a speed command. Line B indicates that, even if switching from speed control to position control is performed, the speed command is maintained in the period of time from the switching to position control until the issuance of movement command for high-speed cycle machining. Upon issuance of the movement command for high-speed cycle machining, the speed command is stopped.

Item C represents position control mode. Line C indicates that switching from speed control to position control is performed without any time lag. When a predetermined period elapses after switching to position control mode, the speed command is issued.

Item D represents compensation operation for the position control start reference position. Line D indicates that movement operation for moving the spindle motor to the position control start reference position is performed when the control mode of the spindle motor is switched from speed control mode to position control mode.

Item E represents the movement command for high-speed cycle machining. Line E indicates that, when the control mode of the spindle motor is switched from speed control mode to position control mode, the movement command is issued, acceleration control being not executed since the spindle is not decelerated. Since synchronization is not guaranteed in the period of time up to completion of the compensation operation D to the position control start reference position, the above period of time corresponds to a non-cutting command portion. Line F indicates the state in which the compensation operation to the position control start reference position is completed.

T1 is the time required for switching from speed control mode to position control mode and T2 is the differential time between T1 and the time (T1+T2) required for such switching in the prior art.

The function of switching between speed control mode and position control mode in the present invention uses the following means (A) to (D) for switching the control mode of the spindle motor from speed control to position control.

(A) Means for keeping the rotation state of the spindle motor without decelerating and stopping it after switching to position control mode until a movement command is started;

(B) Means for allowing a reference position for starting position control at the time of switching to position control mode to be specified by an NC program;

(C) Means for correcting the rotation position while keeping the spindle motor rotating by adding a compensation pulse to a position command pulse to temporarily change the movement speed;

Means (A) is used to keep the spindle motor rotating after switching to position control mode until the execution of the movement command data for high-speed cycle machining is started. When the execution of movement command data is started, switching to the operation according to the command data is performed, but, in that state, the movement is performed from an unspecified position other than the position control start reference position. Therefore, according to means (C), when the movement command is executed, a compensation pulse is calculated so as to obtain the rotation position to be assumed when the movement command would be executed from the position control start reference position specified by means (B), and the rotation position is corrected while keeping the spindle motor rotating by adding a compensation pulse to a position command pulse to temporarily change the movement speed.

Specifically, as the movement command is executed at the time of switching to position control with the rotation of the rotation axis maintained, the rotation axis starts operating in an arbitrary rotation state. However, the difference between the spindle position and the position control start reference position of the spindle is calculated so that the rotation position (the position read out from the position detector connected to the spindle motor) at the start of the execution of the movement command becomes equal to the reference position, with the result that the value of minus 10 degrees is stored as the total amount of compensation pulse.

The amount of movement corresponding to the compensation pulse, together with the command pulse for each computation cycle calculated according to the program command data, is output to a unit that drives the spindle motor. At this time, if the compensation pulse corresponding to the total amount of compensation pulse is output at a time, the acceleration/deceleration capability of the spindle motor is exceeded; so the compensation pulse for each computation cycle is limited to less than a prescribed value (a value stored as data of parameters for setting the operation conditions of the numerical controller) so that the compensation operation is completed within a plurality of computation cycles.

(D) Means for outputting the signal that notifies the completion of switching to position control mode when all of the compensation pulse corresponding to the stored total amount of compensation pulse is output:

Movement from the position control start reference position is not performed according to the program command until the compensation operation by means (C) is completed, so cut-in operation for the workpiece needs to be suspended. According to the program command, it is possible to start cut-in operation depending on the state of an output signal, so the signal that notifies the completion of switching to position control mode is output when all of the compensation pulse corresponding to the stored total amount of compensation pulse is output.

In machining of a piston-shaped workpiece, for example, Means (C) can check whether the synchronization between the rotation axis and the cut-in axis in the radial direction of a cylindrical shape is guaranteed or not, this Means (C) can be used as the condition for starting cut-in operation in the radial direction of a cylindrical shape.

Means (A) to (D) above allow a program command in position control to produce a state equivalent to the state where movement is started from the position control start reference position, or to produce an operating state equivalent to the state where, after the spindle motor is stopped, a reference position return operation is performed and movement to the position control start reference position is made when switching to position control mode is performed according to prior art, the rotation axis is accelerated to allow the workpiece to be machined by accelerating the rotation axis with movement command data for high-speed cycle machining for the rotation axis.

As a result, in a conventional machining means which performs round cutting in a speed control mode, and, after switching to position control mode, performs out-of-round cutting by high-speed cycle machining command data, the time required for accelerating or decelerating the spindle motor can be reduced and the machining cycle time for machining of a workpiece under the same machining conditions as in the prior art can be reduced.

Figure 3:
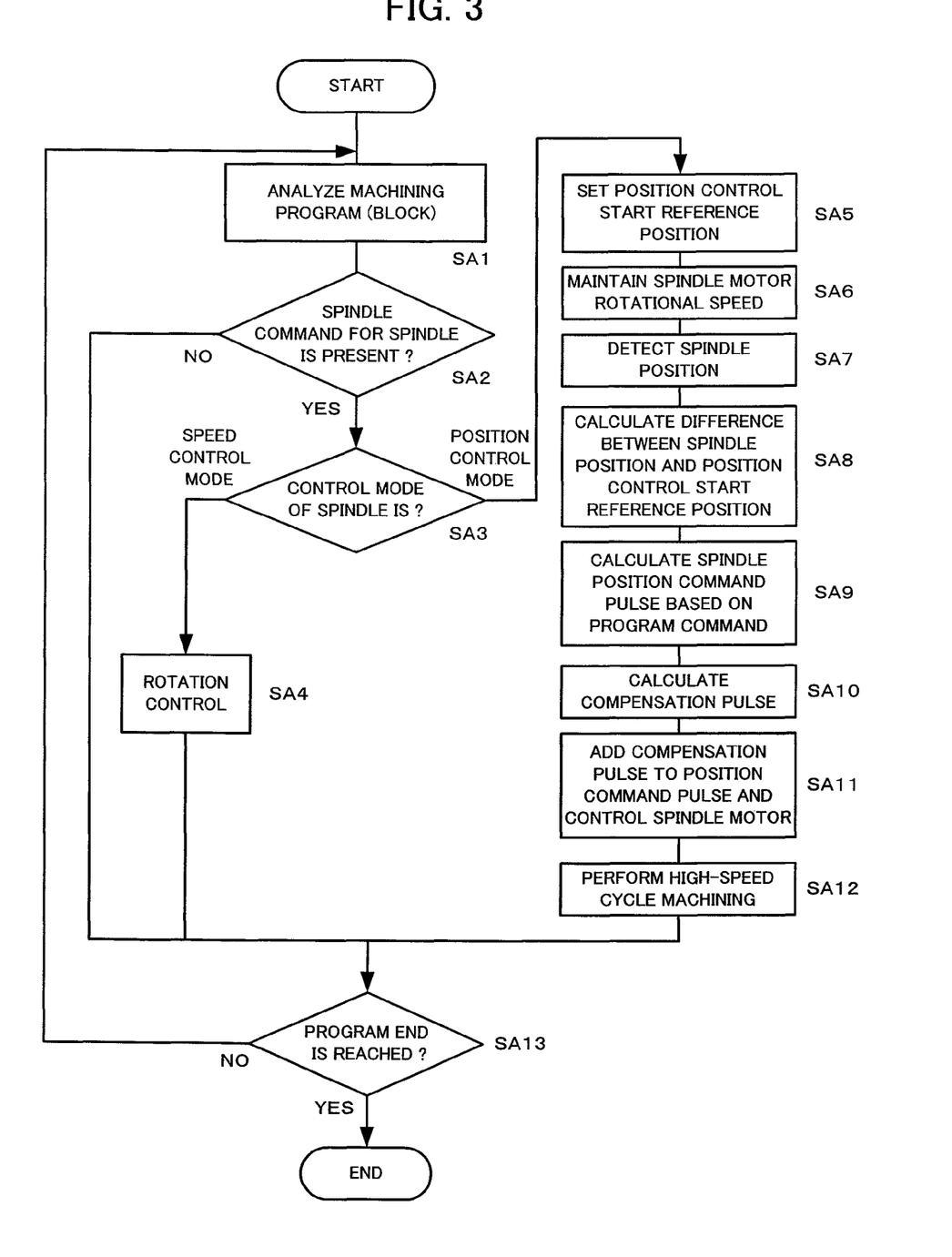
FIG. 3 is a flowchart showing the algorithm of the function of switching between speed control mode and position control mode according to the present invention.

The algorithm of the function of switching between speed control mode and position control mode according to the present invention will be described with reference to the flowchart in FIG. 3.

First, a machining program (block) is analyzed (step SA1) and whether or not there is any spindle command for the spindle is determine (step SA2). If a spindle command is present, the sequence proceeds to step SA3 and checks the control mode of the spindle. If the control mode is speed control mode, then the sequence proceeds from step SA3 to step SA4, whereas if the control mode is position control mode, then the sequence proceeds from step SA3 to step SA5. If there is no spindle command, on the other hand, the sequence proceeds from step SA2 to step SA13.

In step SA5, the position control start reference position of the spindle at which speed control mode is switched to position control mode is set (stored). The rotational speed of the spindle motor immediately before switching to position control mode during execution of a control mode switching command for switching from speed control mode to position control mode is maintained (step SA6). The spindle position is detected (step SA7). The difference between the spindle position and the position control start reference position at the start of outputting of position control mode switching command is calculated and stored (step SA8). The spindle position command pulse is calculated on the basis of the program command and the result is output to a spindle motor driving unit (step SA9). The compensation pulse is calculated from the difference obtained in step SA8 (step SA10). The compensation pulse obtained in step SA10 is added to the position command pulse obtained in step SA9 and the result is output to control the spindle motor (step SA11). High-speed cycle machining is performed (step SA12). Whether the program end is reached or not is determined (step SA13). If the program end is not reached, the sequence returns to step SA1. If the program end is reached, on the other hand, the sequence is finished.

Figure 4:
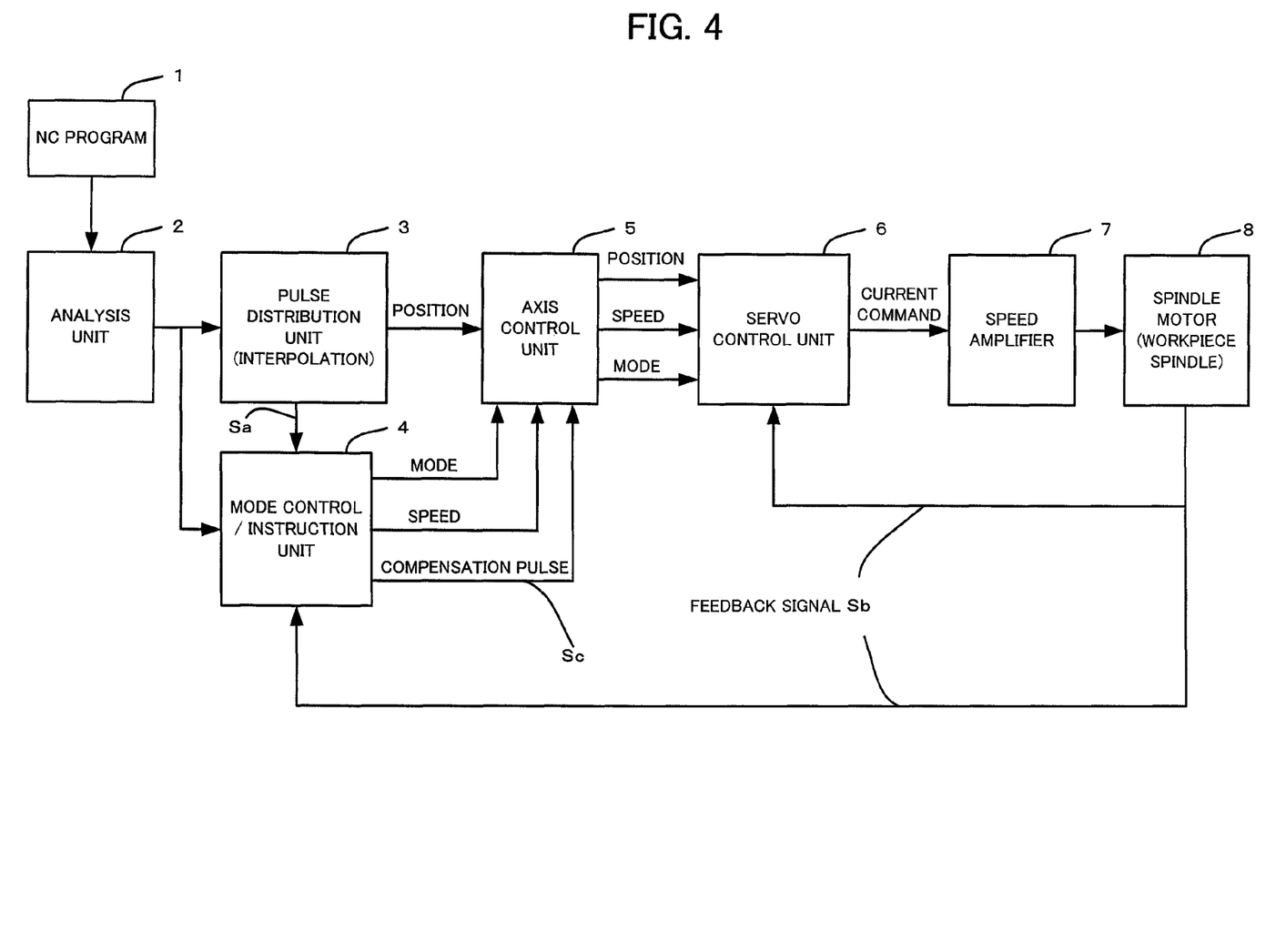
FIG. 4 is a block diagram showing the general structure of an embodiment of the numerical controller according to the present invention.

FIG. 4 is a block diagram showing the general structure of an embodiment of the numerical controller of the present invention.

An NC program 1 is analyzed by an analysis unit 2, processed by a pulse distribution unit 3, and output to an axis control unit 5 as a position command signal for controlling the spindle position. The pulse distribution unit 3 notifies a mode control/instruction unit 4 of an output start signal Sa for indicating the start of output of the position command signal when outputting the position command signal to the axis control unit 5.

The axis control unit 5 outputs the position command signal, a speed command signal, and a mode signal to the servo control unit 6. The servo control unit 6 has a circuit that controls the position, speed, and current of the servo motor (spindle motor) 8 of the spindle (workpiece spindle). The servo control unit 6 supplies a current command to a speed amplifier 7 to control the spindle motor. Description of control of the position and speed of a control axis for controlling a cut-in axis is omitted here.

The analysis unit 2 analyzes the NC program 1 and outputs the result to the mode control/instruction unit 4. The mode control/instruction unit 4 outputs a mode setting signal, a speed signal, and a compensation pulse (Sc) to the axis control unit 5. In position control mode, the mode control/instruction unit 4 continues outputting the speed command signal to the axis control unit 5 until it receives the output start signal Sa from the pulse distribution unit 3 and stops outputting the speed command signal when it receives the output start signal Sa.

The function of switching between speed control mode and position control mode according to the present invention keeps the rotation state of the spindle motor without decelerating or stopping it, until the output start signal Sa is input to the mode control/instruction unit 4 (or until output of the spindle position command starts after switching to position control mode, as shown by line A (spindle speed) in FIG. 2).

When outputting of the position command signal E of the movement command for high-speed cycle machining from the pulse distribution unit 3 to the axis control unit 5 is started, the output start signal Sa is simultaneously output to the mode control/instruction unit 4 from the pulse distribution unit 3. The mode control/instruction unit 4 stops outputting a speed command signal B to the axis control unit 5 when it receives the output start signal Sa (see line B (speed command) in FIG. 2.).

A compensation pulse Sc to be output to the axis control unit 5 from the mode control/instruction unit 4 is used to cancel the difference between the spindle position and the position control start reference position of the spindle. The compensation pulse Sc is output to the axis control unit 5. The axis control unit 5 adds the compensation pulse Sc to the pulse obtained by interpolating the spindle position command signal output from the pulse distribution unit 3. The resulting position command signal is output to the servo control unit 6.

Figure 5:
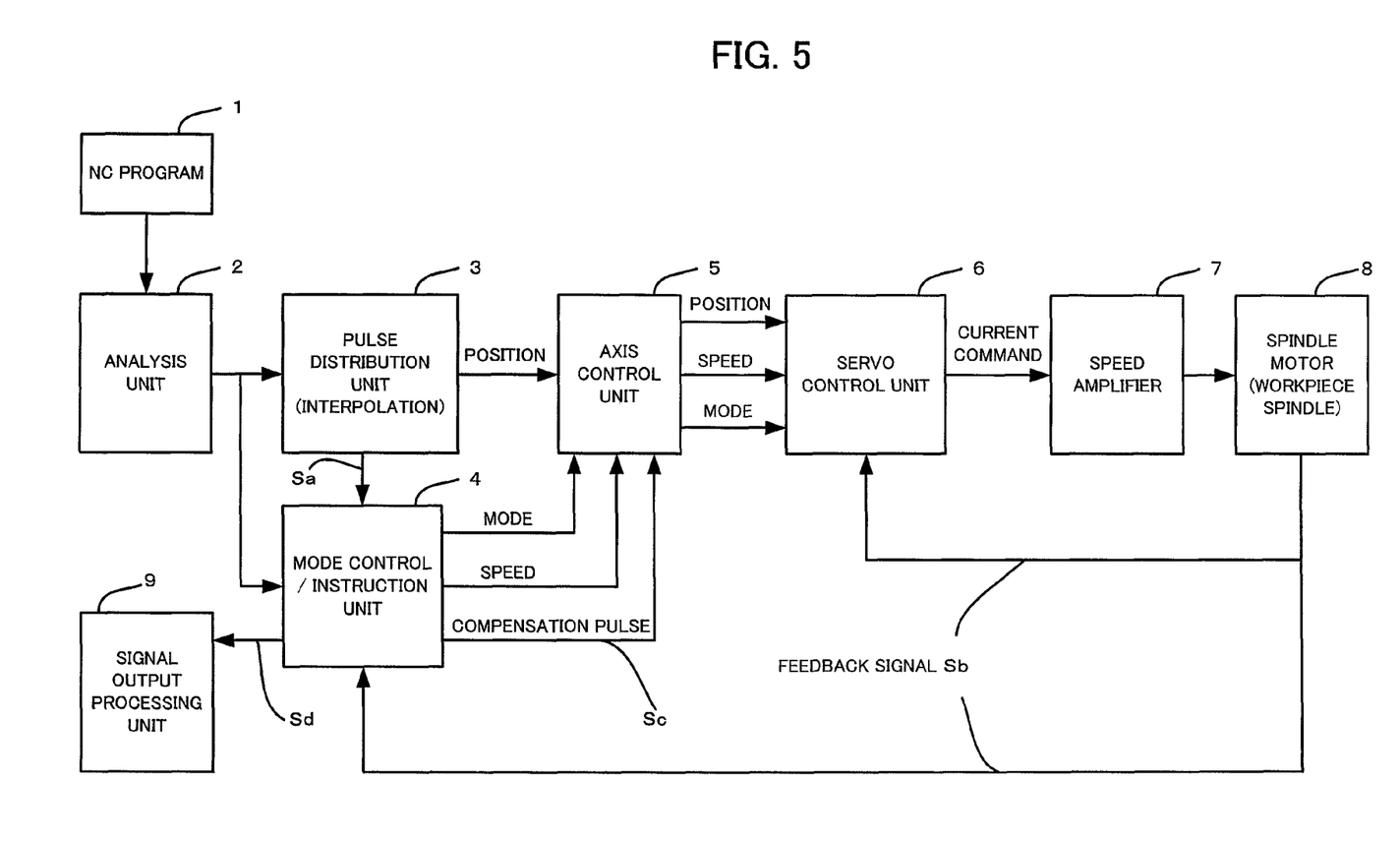
FIG. 5 is a block diagram showing a variation (an example of notifying a signal output processing unit of a notification signal Sd) of the numerical controller in FIG. 4.

FIG. 5 is a block diagram showing the general structure of another embodiment of the numerical controller of the present invention; this embodiment has the same structure as that of the numerical controller shown in FIG. 4, except that a mode control/instruction unit 4 notifies a signal output processing unit 9 of a switching completion notification signal Sd.

The switching completion notification signal Sd is output from the mode control/instruction unit 4 to the signal output processing unit 9 when all of compensation pulse Sc is output to the axis control unit 5. The state where all of the compensation pulse Sc is output to the axis control unit 5 corresponds to the state where movement to the position control start reference position is completed, which guarantees synchronization.

Figure 6A:
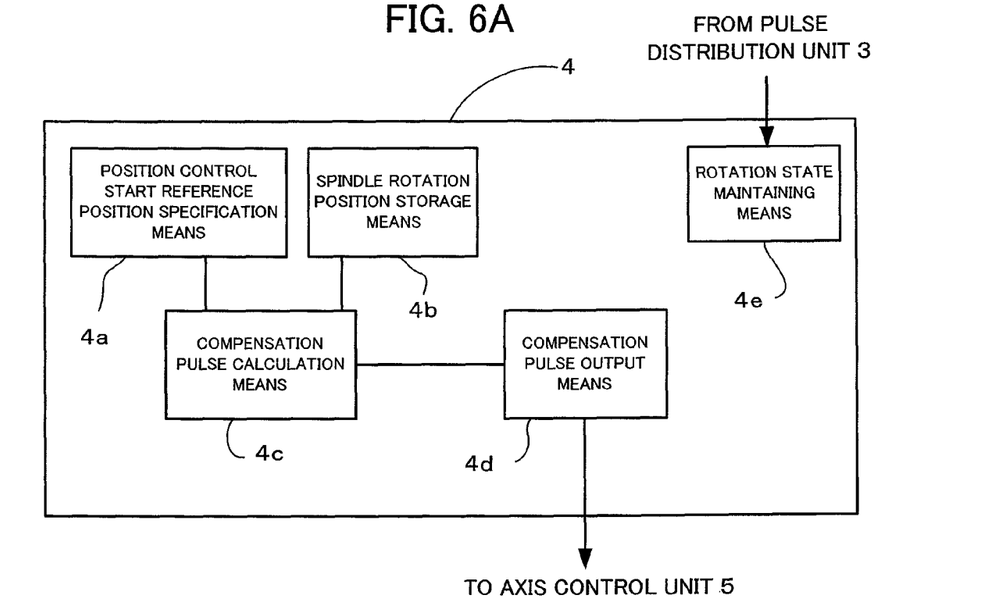
FIG. 6A is a functional block diagram of the mode control/instruction unit 4 of the numerical controller in FIG. 4.
Figure 6B:
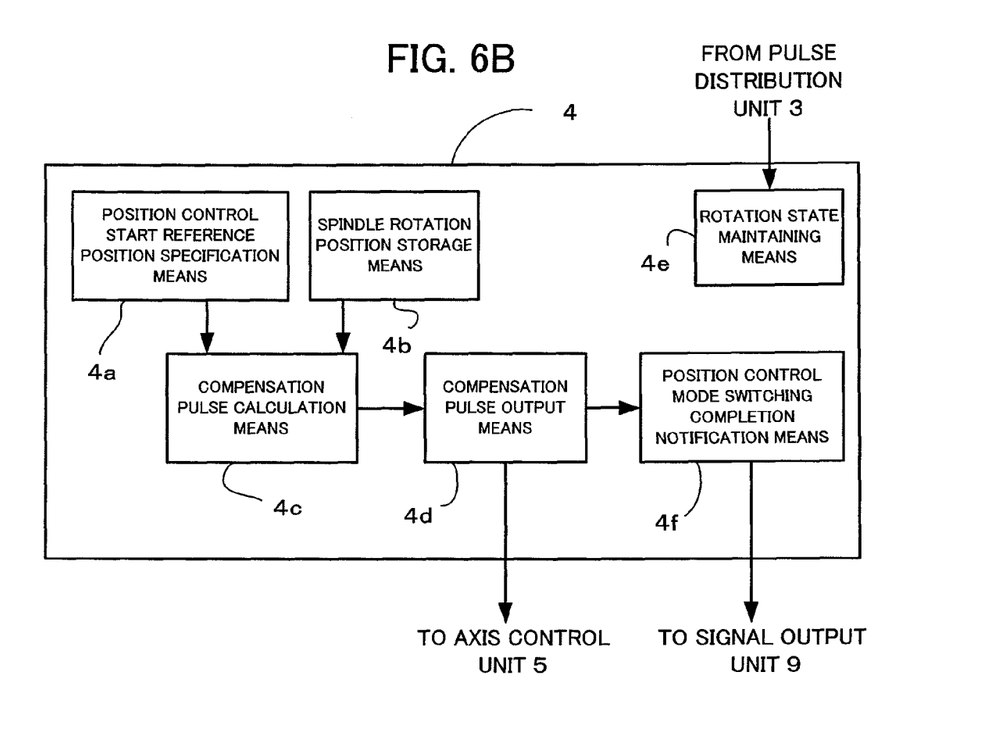
FIG. 6B is a functional block diagram of the mode control/instruction unit 4 of the numerical controller in FIG. 5.

FIGS. 6A and 6B are the functional block diagrams of the mode control/instruction units 4 of the numerical controllers shown in FIGS. 4 and 5, respectively.

When the execution of movement command data is started, switching to rotating operation based on the position command by the command data is performed. In this state, however, movement from an unspecified position other than the position control start reference position is performed.

To solve this problem, the mode control/instruction units 4 has position control start reference position specification means 4a, spindle rotation position storage means 4b and compensation pulse calculation means 4c.

The position control start reference position specification means 4a specifies, at the start of execution of a movement command, the position control start reference position after switching to position control, according to the program command at the time of switching to position control mode or parameter data previously stored in the retention type storage area (such as CMOS) of the numerical controller. The spindle rotation position storage means 4b stores the position of the spindle motor at the time of switching from speed control mode to position control mode. The compensation pulse calculation means 4c calculates the compensation pulse so that the rotation position assumed when a movement command is outputted from an instructed position control start reference position may be obtained. The compensation pulse Sc calculated by the compensation pulse calculation means 4c is output to the axis control unit 5 via a compensation pulse output means 4d. The compensation pulse output means 4d limits the compensation pulse Sc to less than a prescribed value such as the maximum compensation pulse value set for each computation cycle and delivers the compensation pulse to the axis control unit 5.

As the spindle starts operating without stopping the rotation of a rotation axis at the time of switching to position control, it starts operating in an arbitrary rotation state. If the rotation position (that is, the position read out from a rotation detector 82 (see FIG. 1) connected to the spindle motor) at the start of the execution of spindle movement command (position command) deviates from the reference position by plus 10 degrees, for example, then the difference between the spindle position and the position control start reference position of the spindle is calculated so that the rotation position at the start of the movement command corresponds to the reference position, with the result that minus 10 degrees are stored as a total amount of compensation pulse.

When all of the compensation pulse Sc calculated by the compensation pulse calculation means 4c is output to the axis control unit 5 via the compensation pulse output means 4d, a signal Sd for notifying of completion of switching to position control mode is output to the signal output processing unit 9 (see FIG. 6B).

Means 4f for notifying of completion of switching to position control mode and a rotation state maintaining means 4e, shown in FIG. 6B, can execute the corresponding processes by using a flag for monitoring the output of the compensation pulse output means 4d and a flag for monitoring the output of the speed command of the spindle, respectively. For example, the means 4f for notifying of completion of switching to position control mode can use a flag for monitoring whether a compensation pulse storage register in the compensation pulse output means 4d is empty or not.

Therefore, the axis control unit 5 outputs a position command signal generated by the pulse distribution unit 3 and a mode setting signal and a speed command signal, received from the mode control/instruction unit 4, to the servo control unit 6.

As described above, the servo control unit 6 receives the position command signal, the speed command signal and the mode setting signal, read out from the NC program 1, and controls switching of control mode between speed control mode and position control mode according to the mode setting signal based on a switching signal from the NC program.

Figure 7A:
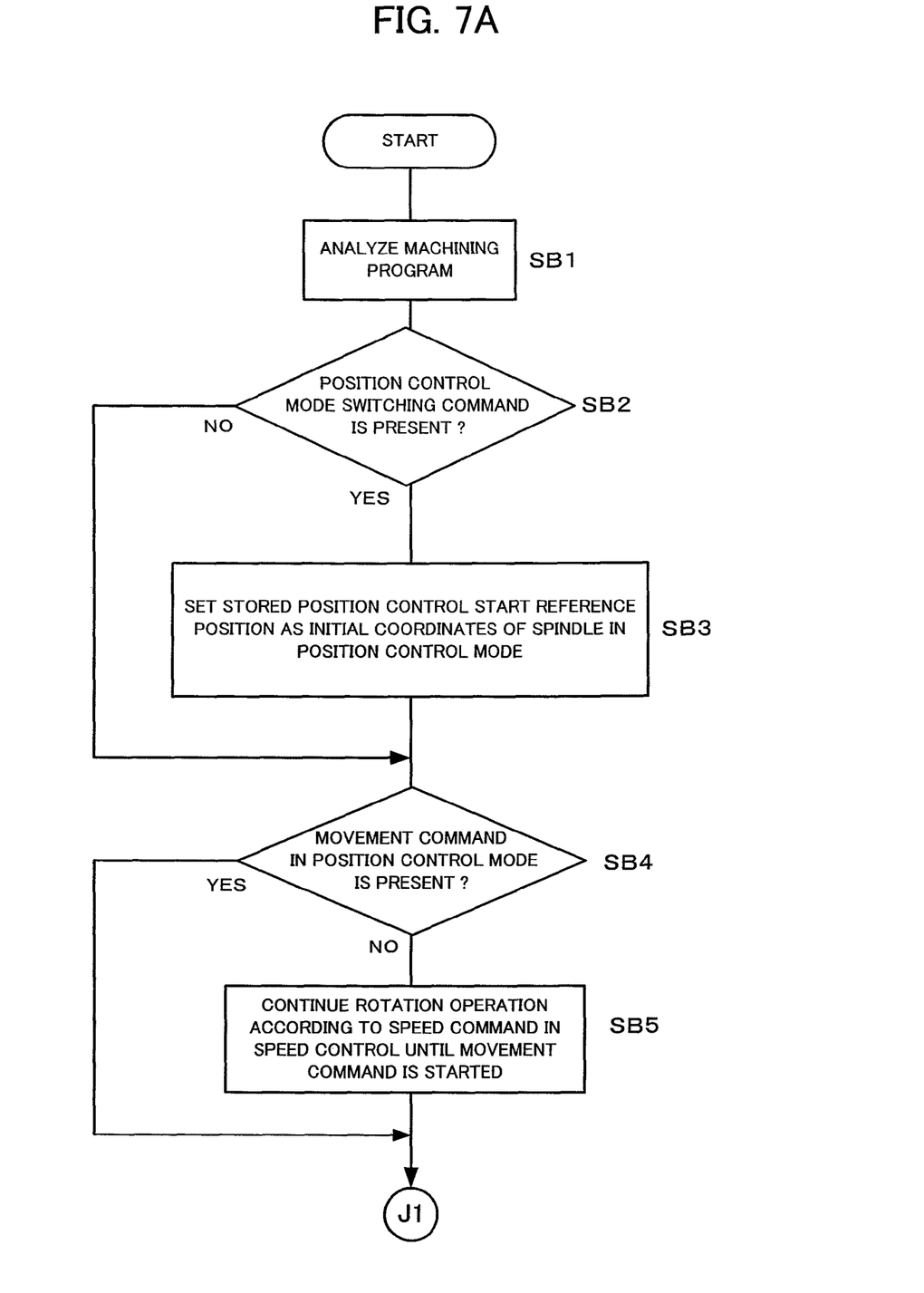
FIG. 7A is a flowchart indicating an example of switching of control mode between speed control mode and position control mode and starting a command from the position control start reference position, performed by the numerical controller of the present invention.
Figure 7B:
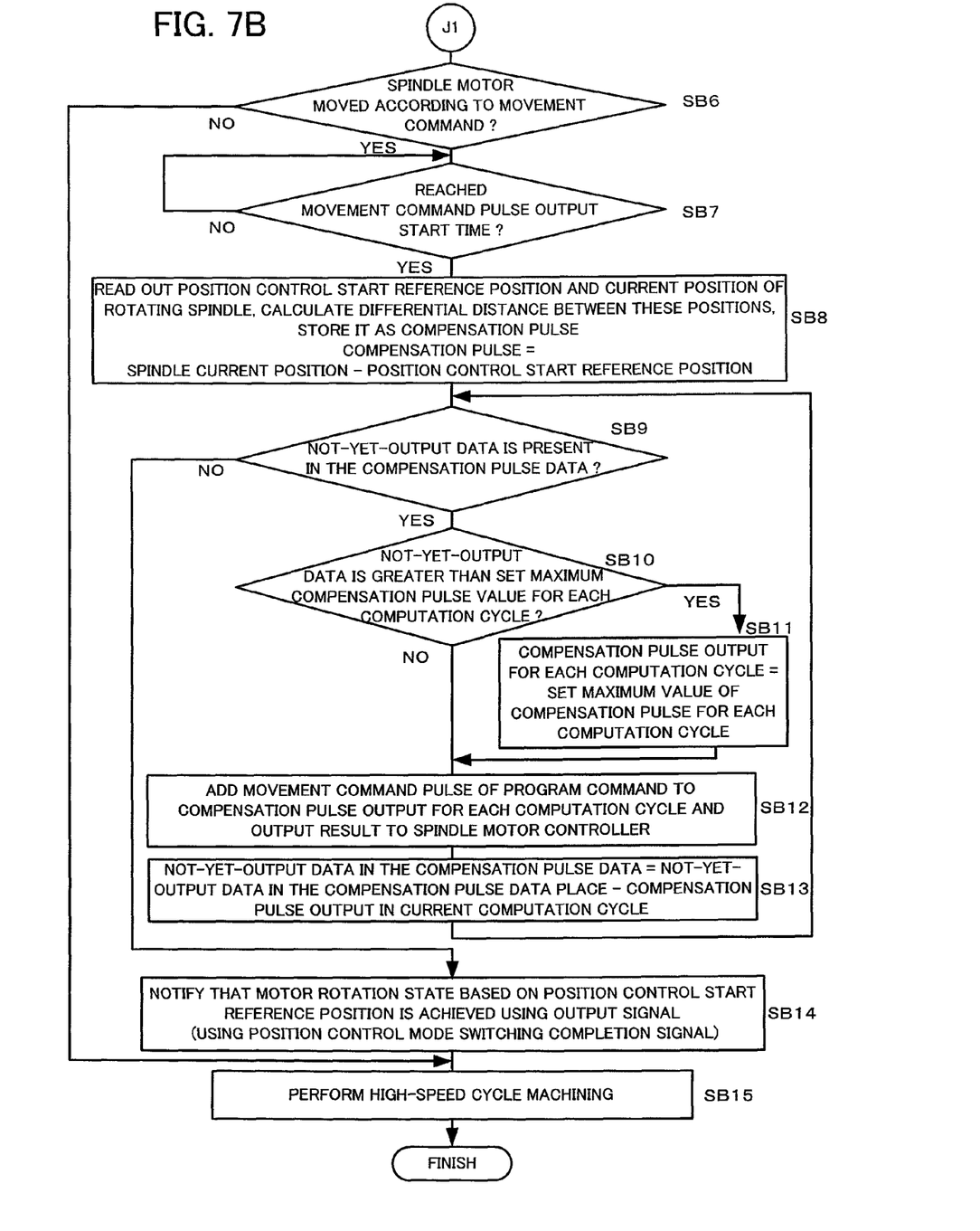
FIG. 7B is a flowchart indicating the processing continued from that in FIG. 7A.

FIGS. 7A and 7B show a flowchart illustrating an example of switching between speed control mode and position control mode and starting of a command from the position control start reference position, which are executed by the numerical controller of the present invention.

A machining program is analyzed (step SB1) and whether or not there is any position control mode switching command in the analyzed machining program (block) is determined (step SB2). When there is a switching command, the stored position control start reference position is set as the initial coordinates of the spindle in position control mode (step SB3) and the sequence proceeds to step SB4. When there is no switching command, on the other hand, the sequence directly proceeds to step SB4.

In step SB4, whether or not there is any movement command in position control mode is determined. When there is no movement command, rotation operation by a speed command in speed control is continued until a movement command is started (step SB5) and the sequence proceeds to step SB6. When there is a movement command, on the other hand, the sequence directly proceeds to step SB6.

In step SB6, whether or not there is movement to the spindle motor by a movement command is determined. When there is no movement, the sequence proceeds to step SB15. When there is movement, on the other hand, whether the current time is movement command pulse output start time or not is determined (step SB7). When the current time is not the movement command pulse output start time, the sequence is suspended until the movement command pulse output start time arrives. When the current time is the movement command pulse output start time, on the other hand, the stored position control start reference position is read out and also the current position of the rotating spindle is read out from the position detector of the spindle motor (step SB8). The difference between the position control start reference position and the detection current position is calculated according to the following equation and the result is stored as a compensation pulse.

Compensation pulse=Current position of spindle−
Position control start reference position Next, whether or not there is any pulse data remaining not output (not-yet output data) in the compensation pulse data is determined (step SB9). When there is no not-yet output data, the sequence proceeds to step SB14. When there is a not-yet output data, on the other hand, then, whether or not the not-yet output data in the compensation pulse data is greater than the set maximum compensation pulse value for each computation cycle (step SB10). When it is greater than the maximum compensation pulse value, the compensation pulse to be output for each computation cycle is set as the maximum compensation pulse value for each computation cycle (step SB11) and the sequence proceeds to step SB12. When it is not greater than the maximum compensation pulse value, on the other hand, the sequence directly proceeds to step SB12.

In step SB12, the movement command pulse of the program command is added to the compensation pulse to be output for each computation cycle and the result is output to the spindle motor controller (servo control unit 6). Next, the not-yet output data in the compensation pulse data is replaced with the value obtained by subtracting, from the not-yet output data in the compensation pulse data, the compensation pulse output in the current computation cycle (step SB13), and the sequence returns to step SB9.

In step SB14, the output signal (signal for notifying of completion of switching to position control mode) is used to notify that the motor rotation state based on the position control start reference position is achieved, high-speed cycle machining is performed (step SB15), and the sequence ends. The sequence may return to step SB1 to perform high-speed machining repeatedly instead of proceeding to the end.

Next, an example of a machining program that machines a workpiece by switching between position control mode and speed control mode will be described with reference to FIG. 8.

Figure 8:
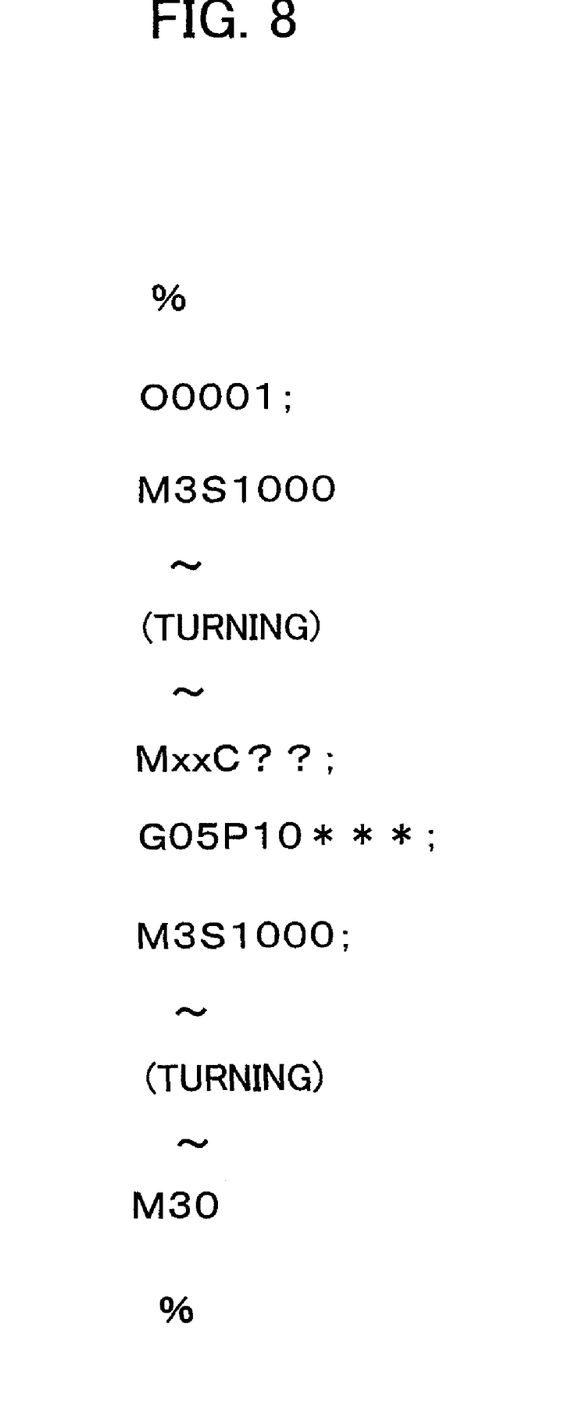
FIG. 8 indicates an example of a machining program for machining a workpiece while switching a control mode between position control mode and speed control mode.

In FIG. 8, "O0001" indicates machining program number 0001. "M3S1000", which is a rotation command in the speed control mode, indicates rotation at 1000 revolutions/minute in the spindle forward rotation direction (M3).

"MxxC??" indicates a position control mode switching code and a position control start reference position, where "Mxx" is a position control mode switching code. Position control mode switching code is newly added to the retention type storage area of the numerical controller as reserved parameter data. This switching code can be used as a program command which enables the function where an arbitrary code is defined. "C" is a rotation position command code and "C??" indicates a position control start reference position. The position control start reference position can be specified by a program command that uses an axis address specified in the same block. This machining program uses an axis address C. If axis address C is not specified, the value set as parameter data stored in the retention type storage area of the numerical controller becomes valid.

"G05P10***" is a command for calling out high-speed cycle machining (G05P). High-speed cycle machining is a function to create, in advance, movement command data for a movement command axis, that can be subject to high-speed pulse distribution at a constant interval, register the created movement command data in the storage area of the numerical controller, and call out the data as a machining cycle with a numerical control command to analyze and execute the data.

"M03" indicates the program end.

The invention claimed is:

1. A numerical controller having a control mode switching function for controlling a spindle by switching a control mode between a speed control mode for rotating a spindle motor according to a speed command and a position control mode for performing position control of the spindle motor according to a movement command, the numerical controller comprising:

means for storing a position control start reference position which is initial coordinates of the spindle in the position control mode;

means for maintaining a rotation of the spindle motor immediately before switching to position control mode during execution of a position control mode switching command for switching the control mode from speed control mode to position control mode;

position detection means for detecting a spindle position;

means for calculating a position command pulse of the spindle on the basis of a program command and outputting the calculated position command pulse to a spindle motor driving unit, during the position control mode;

storage means for calculating and storing a difference between the current position of the spindle in the course of rotation at the start time of output of the position command pulse and the position control start reference position;

compensation pulse calculation means for calculating a compensation pulse from the difference stored in the storage means;

addition compensation means for adding the calculated compensation pulse to the calculated position command pulse and outputting the addition result; and spindle motor driving means for driving the spindle motor based on the addition result output from the addition compensation means, without stopping the spindle motor by using the means for maintaining the rotation of the spindle motor.

2. The numerical controller having the control mode switching function according to claim 1, wherein the compensation pulse calculation means calculates a compensation pulse for each computation cycle of the numerical controller and limits the magnitude of the compensation pulse for each computation cycle to less than a predetermined value.

3. The numerical controller having the control mode switching function according to claim 1 or 2, further comprising a switching completion signal output means for outputting a position control mode switching completion signal when the difference stored in the storage means are output as compensation pulses to allow machining in position control mode to be started after the position control mode switching completion signal is output.

* * * * *